United States Patent [19]

Soumar et al.

[11] Patent Number: 4,541,447

[45] Date of Patent: Sep. 17, 1985

[54] HOT TAP SADDLE FITTING

[76] Inventors: Karel Soumar, 21 Oatley Park Ave., Oatley, New South Wales, Australia, 2223; Earl Erling, 6/5 Benalla Ave., Ashfield, New South Wales, Australia, 2131

[21] Appl. No.: 454,053
[22] PCT Filed: May 14, 1982
[86] PCT No.: PCT/AU82/00076
 § 371 Date: Dec. 28, 1982
 § 102(e) Date: Dec. 28, 1982
[87] PCT Pub. No.: WO82/04111
 PCT Pub. Date: Nov. 25, 1982

[30] Foreign Application Priority Data

May 15, 1981 [AU] Australia ............................. PE8894

[51] Int. Cl.⁴ ...................... F16K 43/00; F16K 51/00
[52] U.S. Cl. .................................... 137/15; 137/318; 285/197; 408/67; 408/207
[58] Field of Search ............................. 137/1, 15, 318; 285/197, 198, 199; 408/102, 67, 203.5, 204, 207, 209; 83/54

[56] References Cited

U.S. PATENT DOCUMENTS

| | | | |
|---|---|---|---|
| 3,692,044 | 9/1972 | Wise | 137/318 |
| 3,905,718 | 9/1975 | Luckenbill et al. | 408/111 |
| 3,983,897 | 10/1976 | Gebelius | 137/67 |
| 4,067,353 | 1/1978 | DeHoff | 408/102 |
| 4,076,038 | 2/1978 | Wynne | 137/318 |
| 4,258,742 | 3/1981 | Louthan et al. | 137/318 |
| 4,294,470 | 10/1981 | Tucker | 285/197 |
| 4,415,000 | 11/1983 | Ödmann | 137/318 |

FOREIGN PATENT DOCUMENTS

| | | |
|---|---|---|
| 486647 | 1/1976 | Australia . |
| 490552 | 6/1976 | Australia . |
| 2129250 | 10/1972 | France . |
| WO81/01737 | 6/1981 | PCT Int'l Appl. . |
| WO81/02461 | 9/1981 | PCT Int'l Appl. . |

Primary Examiner—George L. Walton

[57] ABSTRACT

A hot tape saddle fitting (FIG. 1), has means (5) for connecting a pipe to a chamber (4) having an opening of which a rim (14) in use seals with the exterior of a pressurized main pipe encircled by a collar (1). The fitting is characterized in that a cutter (6) within chamber (4) is operable to cut the saddled main pipe in a chordal direction whereby to connect the pipe to the mains pipe. For preference chamber (4) extends as an elongate tubular body (3) in the chordal direction and cutter (6), is hollow, tubular, sharpened at one end (61), closed at the other end (63), and sealing slideable within body (3).

14 Claims, 6 Drawing Figures

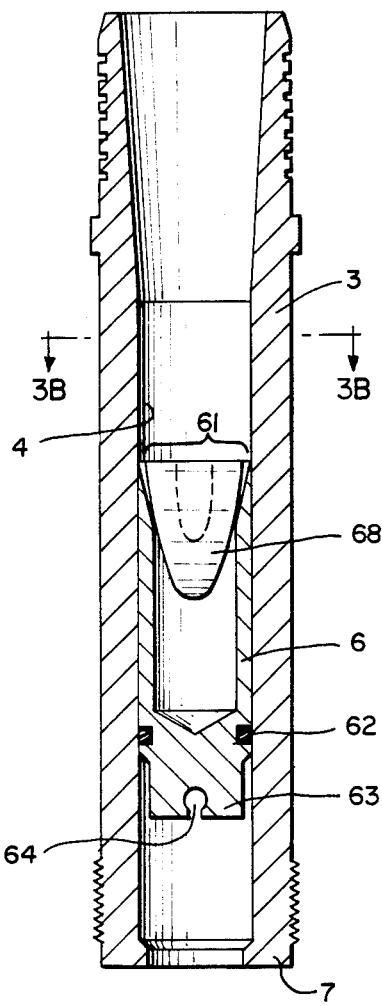
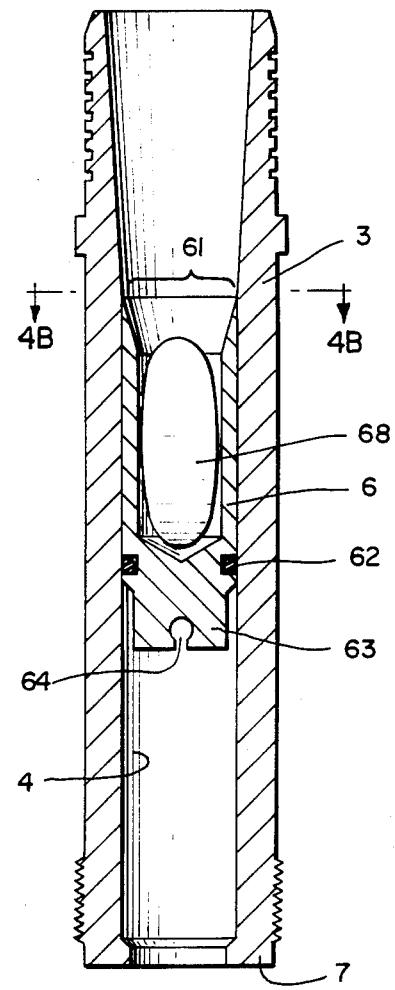
FIG. 3A  FIG. 4A
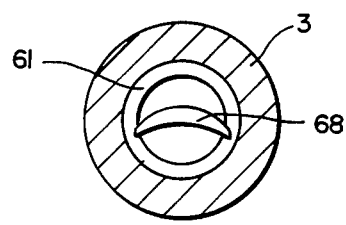
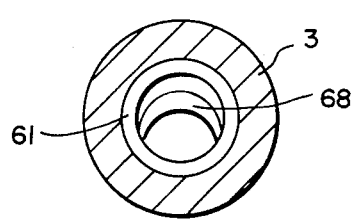
FIG. 3B  FIG. 4B

HOT TAP SADDLE FITTING

TECHNICAL FIELD OF THE INVENTION

This invention relates to a method and apparatus for use in connecting pipes and of particular use for connecting a pipe to a gas main while the main is pressurized.

BACKGROUND OF THE INVENTION

In the past pipe connection to a pressurized gas main has been achieved by means of a hot tap saddle fitting. That fitting provides a chamber which is mounted to the main pipe by a collar, the mouth of the chamber seating against the external wall of the pipe and sealing therewith. A drill bit inside the sealed chamber is operable from outside the chamber to drill radially into the main pipe. A subsidiary pipe to be connected with the main is connected to the chamber usually by coupling means integral with the fitting and the drill bit is then operated so as to pierce the main thereby placing the subsidiary pipe in communication with the interior of the main.

SUMMARY OF THE INVENTION

According to preferred embodiments the present invention provides a hot tap saddle fitting suitable for use with a main pipe made of plastics and which is of a simpler construction than previously known fittings of the type under discussion.

According to one aspect the invention consists in a hot tap saddle fitting of the kind comprising a chamber having an opening, the mouth of the opening being shaped for sealing engagement with the exterior of a plastics main pipe to be saddled, and piercing means within the chamber operable from outside the chamber to pierce the main pipe saddled whereby to place the interior of the main pipe in communication with the chamber, said saddle fitting being characterised in that the piercing means comprise a cutter acting to cut the main pipe saddled in a chordal direction.

It has been found that by slicing the main in a chordal direction, rather than by drilling into it in a radial direction, a swarf free opening is obtained.

BRIEF DESCRIPTION OF THE DRAWINGS

By way of example only an embodiment of the invention will now be described with reference to the accompanying drawings wherein:

FIG. 3A is a top, cross-sectional view of a saddle fitting according to the invention, wherein the tubular cutter is midway through the process of cutting through a plastics main pipe;

FIG. 3B is a cross-sectional view of the tubular cutter illustrated in FIG. 3A along line 3B—3B;

FIG. 4A is likewise a top, cross-sectional view of a saddle fitting according to the invention, wherein the tubular cutter has completed its cutting stroke, and FIG. 4B is a cross-sectional view of this saddle fitting taken along the line 4B—4B.

DESCRIPTION OF PREFERRED EMBODIMENTS

Figure 1:
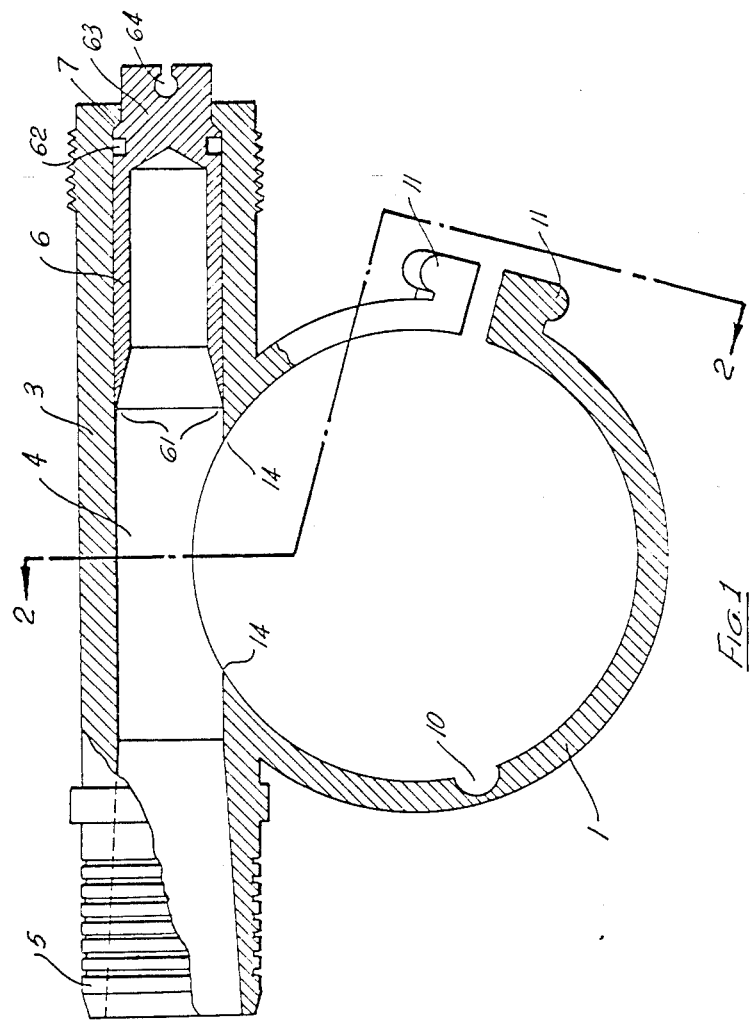
FIG. 1 shows a cross-section of a saddle fitting according to the invention.
Figure 2:
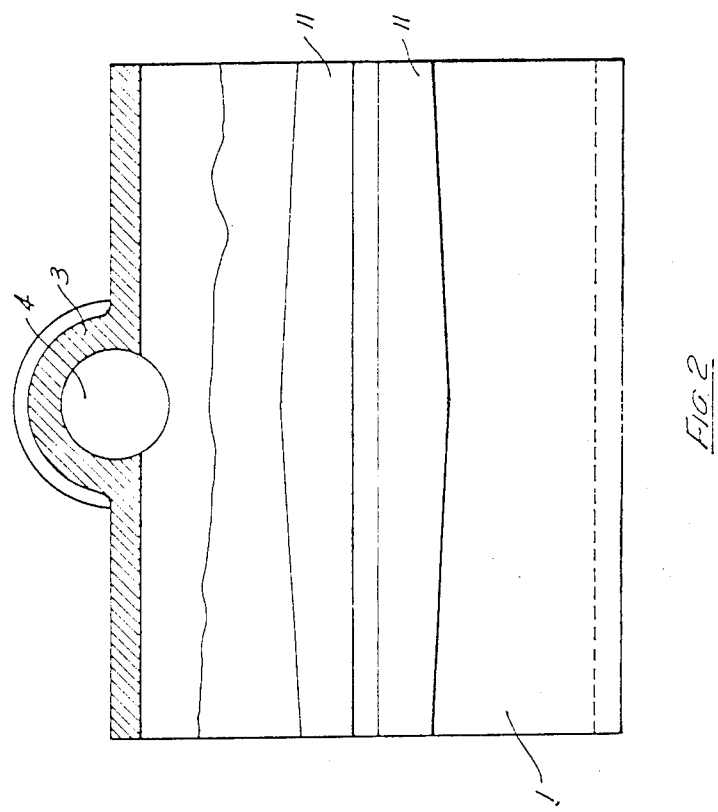
FIG. 2 shows a part cross-section on line 2—2 of FIG. 1.

The fitting comprises a cylindrical split collar 1 adapted to sleeve a gas main. Collar 1 has a groove 10 on its internal surface extending in a direction parallel the cylinder axial direction and which facilitates hinge opening of the collar for positioning of the fitting to saddle a main pipe. Collar 1 has radially outwardly extending projections 11 adjacent the split whereby the collar may be clamped tightly to a gas main. For preference projections 11 are wedge shaped to facilitate tight clamping to a main pipe by clamp means not shown in the drawings.

An elongate tubular body 3 extends in the direction chordal to the circumference of collar 1 and defines a chamber 4 having an opening the mouth of which is defined by rim 14 which in use seals with a pipe saddled. Tubular body 3 extends to a pipe connection means 5 adapted for connection with a subsidiary pipe. In the present example connection means 5 is a spigot adapted for connection by the joining method described in co-pending application PCT/AU80/00020 but other connection fittings could be used.

Tubular body 3 extends from chamber 4 in a direction away from connection means 5 to house a hollow tubular cutter 6. Tubular cutter 6 has a cutting edge 61 at the end of adjacent chamber 4 of a radius less than the internal radius of tubular body 3 thereby allowing some clearance between cutter 6 and body 3.

Cutter 6 is closed at the end remote from cutting edge 61. Cutter 6 is provided with O-ring 62 which permits movement of the cutter in the axial direction of tubular body 3 while maintaining a seal between cutter 6 and body 3. Closed end 63 of cutter 6 is provided with groove means 64 for connection of a driving tool (not shown in the drawings) whereby the cutter may be driven into chamber 4 from outside the fitting. Tubular body 3 is provided with radially inwardly extending shoulders 7 which prevent egress of cutter 6 from that end of tubular body 3.

FIGS. 3A, 3B, 4A, and 4B illustrate the operation of the invention. Specifically, FIGS. 3A and 3B illustrate how the cutter 6 appears in mid-cutting stroke as the cutter 6 is slid within the tubular body 3 along a chordally-oriented cutting path. As is evident from the figures, the beveled shape of the cutting edge 61 both cuts and "rolls" the swarf 68 within the hollow interior of the cutter 6 as the cutter 6 is slid along the chordal path. FIGS. 4A and 4B illustrate how the swarf 68 is resiliently contained within the cutter 6 after completion of the cutting stroke. As is particularly evident from FIG. 4B, the cutting and "rolling" action of the cutting edge 61 of the cutter 6 cooperates with the natural resiliency of the plastic forming the swarf 68 to tightly and positively retain the resulting swarf 68 within the interior of the cutter 6.

In use a solvent, adhesive, or welding means, may be used to ensure a seal between the internal surface of collar 1 adjacent chamber 4 with the outer surface of a mains pipe encircled by collar 1. A subsidiary pipe to be tapped to the mains is connected at 5. Tubular cutter 6 is then driven in the chordal direction towards the pipe so as to cut open the pipe and permitting communication between the main and the subsidiary pipe.

In use, the plastics portion cut from the main pipe remains contained and resiliently engaged within the hollow cutter by virtue of the fact that the cutter inner diameter is narrower than the width of the strip cut from the main pipe, as is clearly illustrated in FIG. 1.

For preference the fitting is moulded from plastics for example nylon. The cutter may for example be of steel or a plated steel. As will be readily understood fittings according to the invention may be made in a variety of sizes and/or with other junctions, unions or valves integral with tubular body 3. The cutter may be slideable or may be fitted with a screw thread enabling it to be driven towards the main by rotation. While it is highly preferred that the saddle chamber be provided with means for connecting a subsidiary pipe to the chamber of the fitting, means for making that connection may be manufactured at the time of jointing and need not be part of the saddle fitting itself.

The claims defining the invention are as follows:

1. A hot tap saddle fitting of the kind comprising a tubular chamber having an opening, the mouth of the opening being shaped for sealing engagement with the exterior of a plastics main pipe to be saddled, and piercing means within the chamber operable from outside the chamber to pierce the main pipe saddled wherein to place the interior of the main pipe in communication with the chamber, said saddle fitting being characterised in that the piercing means comprises a tubular cutter slidably movable within the interior of the tubular chamber in a chordal direction across the main pipe, and having a cutting edge at its open end, and a hollow interior, wherein said cutting edge cuts said main pipe in a chordal direction and guides and rolls the leading edge of the resulting swarf into said hollow interior of said cutter, where it assumes a crescent shape cross-section whose lateral edges resiliently engages the interior of said cutter where it is positively retained in the cutter in an edgewise orientation after the swarf has been completely cut from said pipe.

2. Apparatus according to claim 1 wherein the chamber comprises an elongate hollow tubular body of which the tubular wall has an opening, the rim of the opening being saddle shaped so that the body may be clamped astride a main pipe with said rim continuously engaging the outer surface of the main pipe and the elongate body extending in a direction which is chordal to the main pipe circumference.

3. Apparatus according to claim 1 or claim 2, wherein the chamber is provided with a generally cylindrical split collar whereby the chamber may be mounted to the main pipe with the rim surrounding the opening of the chamber in sealing engagement with the exterior surface of the main pipe.

4. Apparatus according to claim 1 or claim 2 or claim 3 including means for connection of the chamber to a subsidiary pipe to be joined to the main pipe.

5. Apparatus according to claim 4 wherein the subsidiary pipe connection means is a spigot.

6. A hot tap saddle fitting for connecting a subsidiary pipe to a main pipe formed from plastics, comprising;

a tubular chamber having a first opening which includes a rim which is shaped for sealing engagement with the exterior of the main pipe to be saddled, said chamber having a second opening for connection with the subsidiary pipe;

said chamber extending to one side of the first opening and containing a cutter within its tubular interior which is movable along a chordally-oriented path relative to the main pipe to cut the main pipe in a chordal direction, said cutter comprising an elongate hollow tube having a cutting edge at the open end formed by a chamfer, wherein said cutting edge is formed by the outer diameter of the hollow tube, and closed at the other end wherein said cutting edge cuts said main plastic pipe in a chordal direction and guides rolls and wedges the leading edge of the resulting resilient swarf into the hollow portion of the tube of said cutter where it assumes a crescent shape cross-section whose lateral edges resiliently engages the interior of said cutter where it is positively retained in the cutter in an edgewise orientation after the swarf has been completely cut from said pipe.

7. Apparatus according to claim 6 wherein the chamber extending to one side of the first opening comprises an elongate hollow tubular body extending in a direction which is chordal to a main pipe saddled and which sleeves the cutter.

8. Apparatus according to claim 7 wherein the chamber is provided with a generally cylindrical split collar whereby the chamber may be mounted to a main pipe with the rim surrounding the first opening of the chamber in sealing engagement with the exterior surface of the main pipe.

9. Apparatus according to claim 8 wherein the elongate hollow tubular body and the collar consist of a single part molded from plastics.

10. Apparatus according to claim 7 comprising means providing a gas tight seal between the radially outer surface of the cutter and the radially inner surface of the tubular body.

11. Apparatus according to claim 7 wherein the subsidiary pipe connection means is a spigot formed on the elongate hollow tubular body.

12. A method for joining a pipe with a plastic gas main containing gas under pressure by means of an improved hot tap saddle fitting including a tubular chamber having an opening, and a tubular cutter slidably movable within the interior of the tubular chamber along a chordally-oriented path relative to the plastic gas main pipe, and having a cutting edge and a hollow interior, comprising the steps of:

(a) sealing engaging said chamber opening to a portion of said plastic gas main;

(b) cutting said portion of said plastic gas main with said movable cutter by slidably moving said cutter within said tubular chamber along a chordal direction so that said pressurized gas communicates with said chamber; and (c) guiding rolling and wedging the leading edge of the resilient swarf which results from said cutting step into the hollow interior of said cutter where the swarf assumes a crescent shape cross-section whose lateral edges resiliently engages the interior of said cutter where it is positively retained in the cutter in an edgewise orientation after the swarf has been completely cut from said pipe.

13. The method defined in claim 12, wherein said cutter is slidable, and wherein said cutter is forceably slid into a cutting position to cut said portion of said plastic gas main.

14. The method defined in claim 13, further including the step of:

withdrawing said cutting edge from said cutting position, whereby said swarf is removed from said portion of said plastic gas main, thereby facilitating fluid communication between said chamber and the interior of said plastic gas main.

* * * * *